(12) United States Patent
Hwang et al.

(10) Patent No.: US 9,017,470 B2
(45) Date of Patent: Apr. 28, 2015

(54) LOW CARBON-DIOXIDE ADDITIVE COMPOSITIONS AND WARM-MIX ASPHALT BINDER AND MIXTURE PRODUCTION METHOD USING THE ADDITIVE

(75) Inventors: Sung Do Hwang, Gyeonggi-Do (KR); Kyu Dong Jeong, Seoul (KR); Sung Lin Yang, Gyeonggi-Do (KR); Soo Ahn Kwon, Gyeonggi-Do (KR); Seung Han Cheon, Daejeon (KR)

(73) Assignee: Korea Institute of Construction Technology, Gyeonggi-do (KR)

( * ) Notice: Subject to any disclaimer, the term of this patent is extended or adjusted under 35 U.S.C. 154(b) by 483 days.

(21) Appl. No.: 13/059,924

(22) PCT Filed: Mar. 31, 2010

(86) PCT No.: PCT/KR2010/001985
§ 371 (c)(1),
(2), (4) Date: Feb. 18, 2011

(87) PCT Pub. No.: WO2011/025116
PCT Pub. Date: Mar. 3, 2011

(65) Prior Publication Data
US 2011/0203484 A1    Aug. 25, 2011

(30) Foreign Application Priority Data

Aug. 31, 2009 (KR) .................. 10-2009-0081136
Aug. 31, 2009 (KR) .................. 10-2009-0081138

(51) Int. Cl.
*C04B 24/08* (2006.01)
*C08L 91/06* (2006.01)
(Continued)

(52) U.S. Cl.
CPC . *C08L 95/00* (2013.01); *C08K 5/01* (2013.01); *C08L 91/06* (2013.01)

(58) Field of Classification Search
CPC ............ C08L 95/00; C08L 98/06; C08K 5/01
USPC .................................................. 106/268, 269
IPC .................................... C04B 24/08; C08L 91/06
See application file for complete search history.

(56) References Cited

U.S. PATENT DOCUMENTS 4,028,436 A * 6/1977 Bogan et al. ................... 528/271
6,214,103 B1 * 4/2001 Kitagawa ................. 106/284.01
(Continued)

OTHER PUBLICATIONS

Hurley et al., "Evaluation of SASOBIT® for Use in Warm Mix Asphalt" NCAT Report 05-06, National Center for Asphalt Technology Auburn University, 277 Technology Parkway Auburn, AL 36830, pub date, Jun. 2005.

(Continued)

*Primary Examiner* — Jun Li
(74) *Attorney, Agent, or Firm* — J.C. Patents (57) ABSTRACT

Provided are a low carbon additive for a warm-mix asphalt (WMA) mixture, in which vegetable wax based on modified palm wax is mixed into polyethylene wax so as to be able to promote high-temperature physical properties of the WMA mixture as well as solve problems on low-temperature physical properties of the WMA mixture, warm-mix asphalt produced using the same, and a method of producing the WMA mixture using the using the warm-mix asphalt. The low carbon additive contains polyethylene wax and vegetable wax at a weight ratio of 20:1 to 1:2. The modified palm wax employs palm wax that melt-reacts with sodium hydroxide (NaOH) and stearic acid ($CH_3(CH_2)_{16}COOH$). This low carbon additive enables the WMA mixture to be efficiently produced, and thus makes it possible to reduce heating energy required when the WMA mixture is produced. Thereby, it is possible to remarkably reduce the emission of carbon dioxide that is a principal factor of global warming.

17 Claims, 2 Drawing Sheets

(51) Int. Cl.
  *C08L 95/00* (2006.01)
  *C08K 5/01* (2006.01)

(56) References Cited

U.S. PATENT DOCUMENTS

| | | | | |
|---|---|---|---|---|
| 8,034,172 | B2* | 10/2011 | Naidoo et al. | 106/273.1 |
| 2003/0229168 | A1* | 12/2003 | Borsinger et al. | 524/275 |
| 2006/0230981 | A1* | 10/2006 | Dean | 106/270 |
| 2006/0243323 | A1* | 11/2006 | Wantling et al. | 137/87.01 |

OTHER PUBLICATIONS

Yang et al., "Development of Warm-Mix Asphalt Additive and Evaluation of Performance," Transportation Research Record: Journal of the Transportation Research Board No. 2294, Jan. 18, 2013, pp. 89-97.

Kim et al., "Performance Evaluation of Warm- and Hot-Mix Asphalt Mixtures Based on Laboratory and Accelerated Pavement Tests," Advances in Materials Science and Engineering, vol. 2012, Dec. 9-10, 2012, pp. 1-9.

Kim et al., "Building Sustainable Pavements with Wax-Based Compound Using a Warm-Mix Asphalt Technology in Korea," Proceedings of the Eastern Asia Society for Transportation Studies 8, Jun. 2011, pp. 1-8.

Kim et al., "Laboratory and Field Experiences of Low Energy and Low Carbon-Dioxide Asphalt Pavement in Korea," Geotechnical Special Publication No. 212, ASCE, Jun. 9-11, 2011, pp. 131-138.

Lee et al., "Comprehensive Laboratory Performance Evaluation of WMA With Leadcap Additives," 2nd International Conference on Warm Mix Asphalt, National Asphalt Pavement Association, May 2011, pp. 1-12.

Lee et al., "Preliminary Study from Korea Warm-Mix Asphalt," Geotechnical Special Publication No. 218, ASCE, Jun. 9-11, 2011, pp. 17-25.

Cho et al., "A Study of Warm-Mix Asphalt's Bonding Properties on the Change of Aggregate Mineral Type and Temperature Under Thin Film Thickness," International Conference on Highway Engineering, Apr. 2012, pp. 499-503.

Kim et al., "Evaluation of Leadcap WMA Additive for Use in PSMA Mixture in China," International Conference on Highway Engineering, Apr. 2012, pp. 81-84.

"Cooler asphalt being spread in Iowa City," Aug. 16, 2011, Retrieved from "ArgusLeader.com".

KCRG-TV9 ABC News, "Iowa City to Lay 'Green' Asphalt," Aug. 16, 2011, Retrieved from "http://www.kcrg.com/news/local/Iowa-City-to-Lay-Green-Asphalt-127824643.html".

KGAN-TV CBS 2 Iowa, "CBS 2 Top Stories," Aug. 16, 2011, Retrieved from "KGAN.com".

LL Pelling Co., "Iowa City Goes Green—One Road at a Time," Aug. 12, 2011, Retrieved from "http://www.llpelling.com/2011/08/iowa-city-goes-green-one-road-at-a-time/".

Hermiston, "Eco-friendly asphalt to be used in Iowa City," Iowa City Press-Citizen, Aug. 16, 2011, pp. 1-2.

Quad-City Times, "Iowa City spreads cooler asphalt on streets," Aug. 16, 2011, Retrieved from "http://qctimes.com/news/local/iowa-city-spreads-cooler-asphalt-on-streets/article_e5fbd584-c800-11e0-b339-001cc4c03286.html".

Solcomhouse, "Iowa City Paves the Way," Aug. 17, 2011, Retrieved from "http://www.solcomhouse.com/iowa-city-paves-the-way-116.htm".

* cited by examiner

LOW CARBON-DIOXIDE ADDITIVE COMPOSITIONS AND WARM-MIX ASPHALT BINDER AND MIXTURE PRODUCTION METHOD USING THE ADDITIVE

TECHNICAL FIELD

The present invention relates to a low carbon additive for a warm-mix asphalt mixture, warm-mix asphalt produced using the same, and a method of producing a warm-mix asphalt mixture using the same, and more particularly to a low carbon additive for a warm-mix asphalt mixture capable of reducing mixture and compaction temperatures of the warm-mix asphalt mixture for asphalt pavement and improving resistance to high-temperature permanent deformation using polyethylene wax and vegetable wax based on modified palm wax, and inhibiting low-temperature physical properties from being reduced by the use of the polyethylene wax, warm-mix asphalt produced using the same, and a method of producing a warm-mix asphalt mixture using the warm-mix asphalt.

BACKGROUND ART

With the pursuit of recent green growth, high attention has been paid to the environment. As such, the reduction in emission of carbon dioxide for preventing global warming is becoming an international interest. This carbon dioxide emission reduction draws attention because of a possibility of creating a commercial value called carbon emission rights in addition to the prevention of global warming.

In the Europe Climate Exchange located in Amsterdam, Netherlands on the largest scale in the world, the carbon emission rights were traded at an amount of four hundred million tons or more in 2006. The trade of the carbon emission rights is increasing 50% or more each year, and thus the attention to the carbon emission rights is increasing.

In the field of pavement technology of asphalt concrete (asphalt mixture, abbreviated to "ascon"), technology for reducing the emission of carbon dioxide in harmony with the atmosphere has been actively reviewed.

Among them, the most attracting technique in practicality and scale is a pavement technique using a low carbon asphalt mixture capable of reducing mixture and compaction temperatures upon asphalt concrete pavement construction.

Typically, the asphalt mixture is produced by charging asphalt, aggregate, mineral filers, etc. into an asphalt mixing plant, and then heating and mixing these materials.

In this manner, the asphalt mixture is produced by a heating process at a high temperature of 160° C. to 180° C., and undergoes cooling to room temperature in a spreading and compacting process for the pavement.

Here, the reason for which the high-temperature heating process is required to produce the asphalt mixture is that it is necessary to liquefy the asphalt such that the asphalt acts as a binder of the aggregate.

Generally, the asphalt mainly used for asphalt pavement is petroleum based asphalt (in which straight asphalt is mainly used and typically called an "asphalt binder"), which exists in a black solid state at room temperature.

As such, the asphalt is heated and liquefied. An adhesive strength of this liquefied asphalt is used for binding of the aggregate.

Thus, the asphalt mixture used for the asphalt pavement is produced as a hot-mix asphalt (HMA) mixture.

To produce the asphalt mixture, a great deal of energy is required to heat the asphalt mixture to a high temperature. Even in construction, the asphalt mixture emits a large quantity of harmful gases such as carbon dioxide ($CO_2$), etc.

Further, the high-temperature asphalt mixture spread and compacted in the event of the asphalt pavement delays a time to open traffic in proportion to a time required to be cooled close to room temperature, and causes workers to be exposed to a risk of a safety accident.

To solve these problems, studies have recently been actively made of a warm-mix asphalt (WMA) mixture, which can be mixed and compacted at a lower temperature than the existing HMA mixture.

In other words, studies have been actively made for reducing the mixture and compaction temperatures of the asphalt and the aggregate to thereby reduce the emission of carbon dioxide caused by the pavement of the asphalt mixture.

Pavement technology using this WMA mixture has the following merits compared to that using the HMA mixture, because the WMA mixture can be produced at a temperature of about 110° C. to 140° C., which is 30° C. to 40° C. lower than a temperature required to produce the HMA mixture.

1) It is possible to inhibit a variety of harmful gases from being generated in the process of producing and spreading the asphalt mixture.

2) It is possible to reduce petroleum fuel as a principal component of green house gas by about 30% in the process of producing the asphalt mixture.

3) It is possible to rapidly reopen traffic by reducing a curing time after the asphalt mixture is applied.

4) It is possible to secure safety of workers because no harmful steam or odor is generated in a road construction field.

A core mechanism of the pavement technology of the WMA mixture is to improve fluidity of the asphalt, i.e. to reduce the viscosity of the asphalt as the binder of the aggregate such that an optimal viscosity of the asphalt is obtained at a lower temperature than the HMA mixture, and that an optimal compaction rate of the asphalt is obtained at a lower temperature.

This technology for reducing the viscosity was proposed in 1956 first by Ladis H. Csanyl of Iowa State University, USA, in which the viscosity of the asphalt is reduced by forcibly injecting steam into the asphalt so as to form foam asphalt caused by moisture and air in the asphalt and thus to reduce an internal stress of the asphalt.

This technology has recently been developed in Europe since 2000 to technology for forcibly emulsifying the asphalt to reduce the viscosity of the asphalt by injecting water instead of steam, and technology for producing a foam-WMA mixture that adds zeolite instead of water to discharge contained moisture into water when the zeolite reaches a predetermined temperature (e.g. about 100° C. or more), and thus emulsifies the asphalt.

Meanwhile, the National Center for Asphalt Technology (NCAT) has reported the WMA mixture in 2005 for which polyethylene wax, Sasobit, produced by a Fischer-Tropsch synthesis method, is used.

Sasobit is a compound having a molecular weight of several hundreds, which is in a solid state at room temperature and is changed into fluid at a higher temperature. This wax is added to the asphalt, thereby abruptly reducing the viscosity of the asphalt above its melting point and experiencing solidification below its melting point. As such, Sasobit is used as an additive for enhancing an effect of the WMA mixture.

Typically, the polyethylene wax may be produced in various methods. Among these methods, one may involve purifying by-products obtained in the process of producing and processing polyethylene to produce the polyethylene wax, and another method may involve pyrolizing polyethylene to produce the polyethylene wax. Further, there is a method of polymerizing a single molecular material to produce wax molecules, which is a representative example of using the Fischer-Tropsch synthesis method as in Sasobit.

The following three methods are used to produce the polyethylene wax.

(1) In the first method, the polyethylene wax is produced from a low-molecular weight by-product obtained in the process of producing a polyethylene resin.

(2) In the second method, the polyethylene wax is produced by pyrolizing a polyethylene resin to reduce its molecular weight.

(3) In the third method, the polyethylene wax is produced by increasing the molecular weight of a single molecular material, for instance, in the Fischer-Tropsch synthesis method.

In general, the physical properties of the polyethylene wax are known to be decided by the line shape of a main chain and a molecular weight in a chemical structure thereof.

In detail, the greater the linearity of the main chain of the polyethylene wax, the higher the molecular regularity. Thereby, crystallinity is increased, and thus the physical properties such as melting point, hardness, etc. are increased. It is known that it is possible to produce the polyethylene wax having excellent physical properties such as melt viscosity when the molecular weight of the polyethylene wax is great.

The polyethylene wax obtained from the by-products obtained in the process of producing the polyethylene resin or by pyrolizing the polyethylene resin, is low in the linearity of the main chain thereof compared to that produced by the Fischer-Tropsch synthesis method, and thus its molecular weight must be increased to improve its physical properties. In this case, the melt viscosity of the polyethylene wax is increased, so that the polyethylene wax cannot be used as the additive of the WMA mixture, and low-temperature stiffness of the polyethylene wax is increased to reduce low-temperature crack resistance of the binder.

In contrast, since the Sasobit wax produced by the Fischer-Tropsch synthesis method has its molecular structure in which a normal alkane (n-alkane) structure takes 90% or more, the Sasobit wax has a long chain aliphatic hydrocarbon structure having fewer branches than the wax produced by any other method.

Thus, the Sasobit wax has low viscosity and high-temperature physical properties, so that it shows physical properties more suitable as a low-carbon additive than any other polyethylene wax.

Due to its low viscosity, the Sasobit wax produced by the Fischer-Tropsch synthesis method has been used as a low-carbon additive, which is very effective for the WMA.

However, although the polyethylene waxes including this Sasobit wax are very excellent in the high-temperature physical properties such as permanent deformation resistance (called rutting resistance), after long-term aging of the asphalt, the asphalt shows an increase in stiffness and a decrease in the rate of change of stiffness (called m-value), and thereby its flexibility is reduced. Thus, it can be seen that the low-temperature physical properties of the asphalt are overall reduced.

As such, the polyethylene waxes including the Sasobit wax have a possibility of reacting as a factor that causes a low-temperature crack of the asphalt mixture (mainly occurring in winter), which is a crack that is originated from the upper portion of a paved layer to be propagated to the lower portion by the imbalance of temperature distribution of the paved layer of the asphalt mixture, and is characterized by transverse generation of the pavement.

Thus, it is necessary to solve a problem on the decrease of the low-temperature physical properties in the WMA mixture using the Sasobit wax as the additive.

DISCLOSURE

Technical Problem

In order to solve the foregoing and/or other problems, the present invention proposes a low carbon additive for a new warm-mix asphalt (WMA) mixture, which is capable of preventing deterioration of low-temperature physical properties of the WMA mixture using polyethylene wax such as Sasobit wax produced by a Fischer-Tropsch synthesis method or polyethylene wax produced by another method, and uses typical polyethylene wax that is difficult to use as the low carbon additive due to high viscosity, WMA applicable to a plant-mix type as well as a pre-mix type by adding this low carbon additive to asphalt, and a WMA mixture using the WMA.

Thus, it is possible to effectively reduce mixture and compaction temperatures of the WMA mixture, and thus to reduce heating energy required in the event of pavement using the WMA mixture. Thereby, it is possible to reduce the emission of carbon dioxide, and thus to provide a foundation for green growth.

Technical Solution

In order to achieve the foregoing and/or other technical solutions, the present invention provides a low carbon additive for a warm-mix asphalt (WMA) mixture which is produced so as to be able to reduce the emission of carbon dioxide. The low carbon additive is produced by mixing predetermined parts by weight vegetable wax into polyethylene wax added to the WMA mixture.

Further, the present invention is designed to mix asphalt with the low carbon additive, and presents a weight ratio of the low carbon additive to the asphalt when mixed. WMA produced in this way is finally mixed with aggregate so as to be able to produce the WMA mixture.

The WMA may be produced by mixing the asphalt and the low carbon additive at a weight ratio of 100:0.5 to 100:15.

The low carbon additive may be produced with polyethylene wax and vegetable wax contained at a weight ratio of 20:1 to 1:2.

Further, modified palm wax may be used as the vegetable wax. The modified palm wax may be obtained by melt reaction of palm wax, which is produced by hydrogenating palm oil extracted from a coconut, with sodium hydroxide (NaOH) and stearic acid ($CH_3(CH_2)_{16}COOH$).

Further, the palm wax and the sodium hydroxide used for the modified palm wax may have a weight ratio of 100:3.5 to 100:4.0, and the palm wax and the stearic acid used for the modified palm wax may have a weight ratio of 100:16.0 to 100:27.5.

Further, the palm wax produced from palm oil extracted from coconuts may be additionally mixed into the modified palm wax.

Also, the palm wax additionally mixed into the modified palm wax may have a melting point of 55° C. to 65° C., and the modified palm wax may have a melting point of 80° C. to 110° C.

Further, the palm wax additionally mixed into the modified palm wax and the polyethylene wax may have a weight ratio of 50:1 to 1:1.

The low carbon additive may further include oil, wherein the polyethylene wax and the oil may have a weight ratio of 20:1 to 2:1.

Further, the oil may have a kinematic viscosity of 20 cSt to 300 cSt (centi-stokes, $mm^2/s$) at 40° C.

Further, the polyethylene wax may be obtained from a by-product of a low molecular weight extracted in the process of producing polyethylene resin that has a melting point of 95° C. to 125° C. and a melt viscosity of 80 cPs to 400 cPs at 140° C., or be produced by pyrolizing polyethylene resin. If the melt viscosity of the polyethylene wax is less than 80 cPs, the polyethylene wax is reduced in physical properties, particularly high-temperature physical properties, so that it is not suitable as asphalt for asphalt pavement. In contrast, if the melt viscosity of the polyethylene wax is higher than 400 cPs, the polyethylene wax has high viscosity, and thus it is difficult to warm-mix the asphalt.

Advantageous Effects

According to the present invention, a low carbon additive is produced by mixing vegetable wax based on modified palm wax into polyethylene wax that is difficult to use as a WMA additive due to high viscosity. When WMA is produced using the low carbon additive, the WMA can be produced within a short time at a temperature of 110° C. to 140° C. in a pre-mix type as well as in a plant-mix type because of a short melting time. Thus, it is possible to reduce heating energy required when a WMA mixture is produced, and thus to remarkably reduce the emission of carbon dioxide that is a principal factor of global warming.

Further, the low carbon additive can inhibit a variety of harmful gases from being generated when pavement is carried out by mixing and compacting the WMA mixture at a temperature of 110° C. to 140° C. When the WMA mixture is produced and used for pavement at a temperature of a hot-mix asphalt (HMA) mixture, its usable time is increased. As such, it is possible to carry out asphalt concrete pavement work advantageous to securing compaction density and performance when the pavement is carried out in the winter when the WMA mixture is subjected to the rapid drop of temperature while being transported and used due to a low air temperature.

Furthermore, the low carbon additive produced according to the teachings of the present invention can not only obtain an asphalt warm-mixing effect when the polyethylene wax produced by the conventional Fischer-Tropsch synthesis method is used, but also prevent the deterioration of low-temperature physical properties, which is a problem when the polyethylene wax produced by the Fischer-Tropsch synthesis method is used.

Meanwhile, since warm-mix ascon can be produced in a plant-mix type, it is applicable to all asphalt mixture plants regardless of equipment characteristics of an as con plant.

Further, it is possible to reduce heating energy when such an asphalt mixture plant is operated, and simultaneously to inhibit a variety of harmful gases from being generated. Further, it is possible to carry out spreading work of the asphalt mixture while securing the safety of workers. Furthermore, it is possible to rapidly open traffic after the spreading work of the asphalt mixture is carried out. In addition, it is possible to easily carry out the pavement on a short section where the pre-mix type is difficult to apply or where accessibility is bad.

BEST MODE

Reference will now be made in detail to the embodiments of the present invention.

The present invention is directed to warm-mix asphalt (WMA) produced by adding a low carbon additive for a WMA mixture, which contains polyethylene wax and vegetable wax based on modified palm wax, to asphalt, and a WMA mixture using the same.

First, the low carbon additive for a WMA mixture mixed with the asphalt according to the present invention will be described.

In the present invention, the low carbon additive added to the asphalt is used for the WMA mixture produced by mixing additive(s), aggregate, etc. with the asphalt such that mixing and compacting temperatures of a hot-mix asphalt (HMA) mixture can be lowered by 30° C. to 40° C.

When the WMA mixture is produced using this low carbon additive, it is possible to secure fluidity required to mix the aggregate with the asphalt or to compact the WMA mixture, and thus it is possible to reduce working temperature for the asphalt as well as to increase high-temperature physical properties.

Here, the polyethylene wax of the present invention should have a melting point of 95° C. to 125° C. and a melt viscosity of 80 to 400 centipoises (cPs) at 140° C.

If the melting point of the polyethylene wax is lower than 95° C., the polyethylene wax may reduce stiffness of the asphalt when mixed with the asphalt. In contrast, if the melting point of the polyethylene wax is higher than 125° C., the polyethylene wax is insufficiently dissolved in the process of producing the WMA. If the melt viscosity of the polyethylene wax at 140° C. is less than 80 cPs, the polyethylene wax is effective for warm-mixing of the asphalt, but it is reduced in high-temperature physical properties, so that it is not suitable as asphalt for asphalt pavement. In contrast, if the melt viscosity of the polyethylene wax at 140° C. is higher than 400 cPs, the polyethylene wax excessively increases the viscosity of the asphalt, and thus it is impossible to achieve warm-mixing of the asphalt mixture.

Meanwhile, as mentioned above, if only the polyethylene wax having a long chain aliphatic hydrocarbon structure produced by the Fischer-Tropsch synthesis method is used to improve performance based on the WMA, this limits selection of the wax and reduces low-temperature physical properties such as a low-temperature crack.

Thus, to eliminate the limitation of the selection of the polyethylene wax, maintain the high-temperature physical properties, and prevent the low-temperature physical properties from being reduced, it is necessary to add another material.

To this end, the present invention adds vegetable wax based on modified palm wax as a constituent material of the additive for the WMA mixture.

In other words, the present invention is configured to produce the WMA mixture (asphalt concrete) using the low carbon additive including the polyethylene wax and the vegetable wax, and prevent the low-temperature physical properties from being reduced.

Here, the vegetable wax based on modified palm wax which constitutes the low carbon additive for the WMA mixture may be contained at a ratio of 20:1 to 1:2, preferably a ratio of 5:1 to 1:2 relative to the polyethylene wax.

For example, the vegetable wax may have 5 to 200 parts by weight, preferably 20 to 200 parts by weight on the basis of 100 parts by weight of the polyethylene wax.

The reason is as follows. If the vegetable wax is less than 5 parts by weight, it is difficult to expect a warm-mixing effect due to a reduction in viscosity and to improve the low-temperature physical properties of the WMA mixture. If the vegetable wax is more than 200 parts by weight, the high-temperature physical properties of the WMA mixture are deteriorated.

The modified palm wax may be used by modifying vegetable wax, for instance, to improve the low-temperature physical properties of the WMA mixture. Preferably, the modified palm wax obtained from vegetable palm oil extracted from coconuts by a hydrogenating process may be used.

The modified palm wax is additionally mixed with palm wax, a melting point of which ranges from 55° C. to 65° C.

Here, the mixed palm wax is produced from vegetable coconut oil extracted from coconuts, and may be added by 2 to 50 parts by weight on the basis of 100 parts by weight of the polyethylene wax. Meanwhile, the palm wax used in the modified palm wax has a low melting point, which restricts an effect of improving physical properties when mixed with the asphalt. As such, to enhance the melting point, the palm wax is modified with sodium hydroxide (NaOH) and stearic acid ($CH_3(CH_2)_{16}COOH$) when used.

A method of modifying the palm wax will be described in greater detail. First, the palm wax is charged into and melted in a reactor, which maintains 200° C. and to which an agitator is attached.

After the palm wax is melted, sodium hydroxide (NaOH) is added by 3.5 to 4.0 parts by weight on the basis of 100 parts by weight of the palm wax, and then is agitated for 30 minutes. Thereby, the following chemical reaction occurs to generate fatty acid (RCOOH).

where R1, R2 and R3 are alkyl groups having 12 to 16 carbon atoms.

The generated fatty acid causes the following secondary chemical reaction with sodium hydroxide, thereby forming sodium salt having a high melting point.

where R1, R2 and R3 are alkyl groups having 12 to 16 carbon atoms.

To further increase the melting point of the modified palm wax, stearic acid is added by 16.0 to 27.5 parts by weight on the basis of 100 parts by weight of the palm wax, and then is agitated for two hours. Thereby, the stearic acid reacts with sodium hydroxide as in the following chemical reaction formula, so that sodium stearic acid salt is generated.

where R4 is stearin.

As a result of the modification, a modified palm wax is finally generated, in which sodium salt is mixed with unreacted palm wax as follows, and which has a melting point of 80° C. to 110° C.

where R1, R2 and R3 are alkyl groups having 12 to 16 carbon atoms, and R4 is stearin.

Meanwhile, to further reduce the viscosity of the asphalt mixture to facilitate warm-mixing, oil may be added to the low carbon additive.

The added oil is paraffin and naphthalene oil having a kinematic viscosity of 20 to 300 cSt at 40° C., and may be added by 5 to 50 parts by weight on the basis of 100 parts by weight of the polyethylene wax.

If the content of oil exceeds 50 parts by weight, the viscosity of the asphalt mixture is reduced, but the high-temperature physical properties of the asphalt mixture are deteriorated. In contrast, if the content of oil is less than 5 parts by weight, the effect of reducing the viscosity of the asphalt mixture is slight.

Next, the low carbon additive as described above is mixed into the asphalt. This mixing method will be described below.

In detail, the low carbon additive of the present invention is charged into an asphalt mixing plant along with the asphalt and aggregate, and is mixed at a temperature of 110° C. to 140° C. Thereby, the low carbon additive may be used to produce warm-mix ascon in a plant-mix type.

Further, after the low carbon additive is melt-mixed with the asphalt, this melt-mixture is charged into an asphalt mixing plant along with the aggregate, and is mixed at a temperature of 110° C. to 140° C. Thereby, the low carbon additive may be used to produce warm-mix ascon in a pre-mix type.

To produce the WMA mixture, 3.5 to 8.0 parts by weight of the asphalt and 92.0 to 96.5 parts by weight of the aggregate are prepared, and the low carbon additive of the present invention may be mixed by 0.5 to 15 parts by weight on the basis of 100 parts by weight of the asphalt.

If the low carbon additive is more than 15 parts by weight, the Cantabro loss for evaluating aggregate segregation and durability at room temperature is bad. In contrast, if the low carbon additive is less than 0.5 parts by weight, the warm-mixing effect is next to nothing.

Further, the asphalt mixed with the low carbon additive of the present invention will do if it is asphalt used for the asphalt pavement. Considering that PG 80-100 asphalt and PG 60-80 asphalt are used as the asphalt for asphalt pavement at present, it is preferable to use this grade of asphalt.

[Mode For Invention]

Hereinafter, the embodiments of the present invention will be described in greater detail. It should be noted that these embodiments are merely illustrative of the present invention, and thus the scope of the present invention is not limited to the following embodiments.

[Embodiments]

(1) Materials

AP: Penetration 70 asphalt having PG 60-80,

PE-M: Polyethylene wax having a melting point of 114° C., a viscosity of 200 cps at 140° C., and a specific gravity of 0.93, PE-H: Polyethylene wax having a melting point of 115° C., a viscosity of 800 cps at 140° C., and a specific gravity of 0.93, Sasobit (trademark): Polyethylene wax extracted from Sasol having a melting point of 112° C. and a viscosity of 40 cps at 140° C., Palm: Palm wax extracted from coconuts, which has a melting point of 60° C. and a viscosity of 6 cps at 140° C., M-palm: Modified palm wax obtained by reaction of 80.8% palm wax, 3.1% sodium hydroxide, and 16.1% stearic acid, which has a melting point of 100° C. and a viscosity of 15 cps at 140° C., and Oil: Paraffin oil having a kinematic viscosity of 100 cSt at 40° C.

(2) Production of Low Carbon Additive for WMA Mixture

The low carbon additive was produced by putting polyethylene wax, modified palm wax, palm wax, and oil into a 1 L reactor at an amount of about 300 g, heating and melting them at 180° C., and mixing them for 20 minutes in a melted state using an agitator. The melt-mixed additive was put into a 3 L cooling water for cooling, and thereby the additive was obtained at a size of about 1 mm to 2 mm.

Composition ratios of the low carbon additives of Embodiments and Comparative Examples which were produced in this way are shown in Tables 1 and 2, which are based on per hundred resin (PHR).

TABLE 1

| Unit (phr) | Embodiment 1 | Embodiment 2 | Embodiment 3 | Embodiment 4 | Embodiment 5 | Embodiment 6 |
|---|---|---|---|---|---|---|
| PE-M | 100 | 100 | 100 | 100 | 100 | 100 |
| M-Palm | 20 | 60 | 200 | 60 | 30 | 5 |
| Palm | — | — | — | — | 30 | — |
| Oil | — | — | — | 30 | — | — |

TABLE 2

| Unit (phr) | Comparative Example 1 | Comparative Example 2 | Comparative Example 3 | Comparative Example 4 | Comparative Example 5 | Comparative Example 6 |
|---|---|---|---|---|---|---|
| PE-M | 100 | 100 | — | — | — | — |
| PE-H | — | — | 100 | 100 | 100 | — |
| Sasobit | — | — | — | — | — | 100 |
| M-Palm | — | 250 | — | 250 | 60 | — |
| Palm | — | — | — | — | — | — |
| Oil | — | — | — | — | 70 | — |

(3) Production of WMA (i.e., Asphalt into which the Low Carbon Additive of the Present invention was mixed)

3 parts by weight an additive for a WMA mixture was added to 100 parts by weight AP (asphalt) heated to 130° C., and then was agitated for 20 minutes using a high-speed shear mixer having a speed of 2,000 rpm. Thereby, the additive was completely melted.

(4) Evaluation of Physical Properties of WMA

With respect to each asphalt (AP) including the WMA produced by adding the additive of the present invention, its physical properties were evaluated on the basis of a performance grade (PG) test, and its viscosity was measured using a rotating viscometer. The physical properties of the WMA of Embodiments and Comparative Examples are shown in Table 3. Here, a content of the low carbon additive used is 3 parts by weight on the basis of 100 parts by weight of the AP (asphalt).

TABLE 3

| | Asphalt before aging (Original) | | | Asphalt after RFTO | Asphalt after PAV | |
|---|---|---|---|---|---|---|
| Low carbon additive | Viscosity (120° C., cps) | Viscosity (140° C., cps) | $G^*/\sin\delta$ (70° C., kPa) | $G^*/\sin\delta$ (70° C., kPa) | Stiffness (−12° C., MPa) | m-value (−12° C.) |
| AP | 1150 | 412 | 0.624 | 1.201 | 189 | 0.33 |
| Embodiment 1 | 950 | 330 | 3.254 | 4.112 | 200 | 0.32 |
| Embodiment 2 | 900 | 310 | 3.013 | 3.805 | 180 | 0.33 |
| Embodiment 3 | 790 | 290 | 1.251 | 2.101 | 166 | 0.35 |
| Embodiment 4 | 810 | 300 | 1.651 | 2.631 | 163 | 0.35 |
| Embodiment 5 | 895 | 305 | 3.002 | 3.705 | 175 | 0.34 |
| Embodiment 6 | 955 | 335 | 3.501 | 4.212 | 205 | 0.32 |
| Comparative Example 1 | 1,067 | 385 | 4.276 | 4.423 | 245 | 0.28 |
| Comparative Example 2 | 720 | 265 | 0.341 | 0.651 | 120 | 0.37 |
| Comparative Example 3 | 1,250 | 450 | 4.783 | 5.023 | 275 | 0.27 |
| Comparative Example 4 | 980 | 320 | 0.362 | 0.721 | 150 | 0.36 |

TABLE 3-continued

| Low carbon additive | Asphalt before aging (Original) | | | Asphalt after RFTO | Asphalt after PAV | |
|---|---|---|---|---|---|---|
| | Viscosity (120° C., cps) | Viscosity (140° C., cps) | G*/sinδ (70° C., kPa) | G*/sinδ (70° C., kPa) | Stiffness (−12° C., MPa) | m-value (−12° C.) |
| Comparative Example 5 | 730 | 290 | 0.461 | 0.891 | 140 | 0.37 |
| Comparative Example 6 | 880 | 316 | 3.792 | 5.299 | 250 | 0.28 |

RTFO (Rolling Thin Film Oven, thin film heating test): Simulation of aging of the asphalt mixture that is mixed with aggregate at a high temperature in a plant in the beginning, transported to an asphalt construction field, and spread in the process of producing the asphalt mixture.
PAV (Pressure Aging Vessel, pressure aging test): Evaluation of aging of the asphalt mixture in a long-term period (In embodiments and comparative examples, 3 parts by weight of the low carbon additive were used on the basis of 100 parts by weight of the AP)
G*/sinδ: Factor associated with rutting resistance of the asphalt
Stiffness: Flexural creep stiffness, particularly asphalt stiffness (300 MPa or less) at a low temperature
m-value: Flexural creep slope, as to whether an abrupt brittle fracture occurs (0.3 or more)

It can be seen from Table 3 that the low carbon additive of the present invention overall represents excellent high- and low-temperature physical properties, which will be described in detail.

If the viscosity (at 120° C. or 140° C.) is higher than that of the AP, and if G*/sin δ for the original asphalt and the asphalt after RTFO is lower than that of the AP, the rutting resistance is low, and thus it is difficult to use the low carbon additive as a low carbon additive.

Further, if the m-value for the asphalt after PAV is more than 0.3 and is higher than that of the AP, it can be determined that the low-temperature physical properties are excellent.

In the case of Comparative Examples 1 and 3 using typical polyethylene wax, it can be seen that, G*/sin δ for the original asphalt and the asphalt after RTFO is high, but the viscosity is similar to or higher than penetration 70 asphalt (PG 64-22, KS F 2389; performance grade standard of asphalt), the low carbon additive is unsuitable for the use as a low carbon additive.

Further, in this case, the m-value for the asphalt after PAV is less than 0.3 and is lower than that of penetration 70 asphalt, and the low-temperature physical properties are bad. Thus, it is vulnerable to fatigue and crack and the use for a low-temperature area may be restricted.

The Sasobit wax of Comparative Example 6 used as a low carbon additive shows low viscosity and excellent rutting resistance, and thus can be used as an excellent low carbon additive for a hot area. However, it can be seen that, like the typical polyethylene wax, the m-value for the asphalt after PAV is less than 0.3, and thus physical properties are bad.

In contrast, in the case of the low carbon additives of Embodiments 1 through 6 of the present invention, it can be seen that they can be used as a low carbon additive because their viscosities at 120° C. to 140° C. are lower than that of penetration 70 asphalt, and have excellent rutting resistance because G*/sin δ for the original asphalt and the asphalt after RTFO is higher than that of penetration 70 asphalt.

Further, it can be seen that, since the m-value for the asphalt after PAV is more than 0.3, the low carbon additives have excellent high-temperature rutting resistance and low-temperature physical properties.

In addition, in the case of Comparative Examples 2 and 4 using an excessive amount of modified palm wax, it seems that the low carbon additives can be used as a low carbon additive due to low viscosity. However, it can be seen that, since G*/sin δ for the original asphalt and the asphalt after RTFO is lower than that of the AP, it is difficult to use the low carbon additives as an asphalt additive for asphalt pavement.

The physical properties of the asphalt were measured according to 0 to 10 parts by weight of the low carbon additive of Embodiment 2 on the basis of 100 parts by weight of the AP, and are shown in Table 4.

TABLE 4

| Content of low carbon additive (phr) | Asphalt before aging (Original) | | | Asphalt after RFTO | Asphalt after PAV | |
|---|---|---|---|---|---|---|
| | Viscosity (120° C., cps) | Viscosity (140° C., cps) | G*/sinδ (70° C., kPa) | G*/sinδ (70° C., kPa) | Stiffness (−12° C., MPa) | m-value (−12° C.) |
| 0 | 1150 | 412 | 0.624 | 1.201 | 189 | 0.33 |
| 1 | 950 | 380 | 1.955 | 2.450 | 185 | 0.33 |
| 3 | 900 | 310 | 3.013 | 3.805 | 180 | 0.33 |
| 5 | 850 | 290 | 4.813 | 5.912 | 176 | 0.34 |
| 10 | 810 | 275 | 6.812 | 7.813 | 173 | 0.35 |

RTFO (Rolling Thin Film Oven, thin film heating test): Simulation of aging of the asphalt mixture that is mixed with aggregate at a high temperature in a plant in the beginning, transported to an asphalt construction field, and spread in the process of producing the asphalt mixture.
PAV (Pressure Aging Vessel, pressure aging test): Evaluation of aging of the asphalt mixture in a long-term period (In embodiments and comparative examples, 3 parts by weight of the low carbon additive were used on the basis of 100 parts by weight of the AP-5)
G*/sinδ: Factor associated with rutting resistance of the asphalt
Stiffness: Flexural creep stiffness, particularly asphalt stiffness (300 MPa or less) at a low temperature
m-value: Flexural creep slope, as to whether an abrupt brittle fracture occurs (0.3 or more)
Additive used: Embodiment 2

It can be seen from Table 4 that the WMA in which the content of the low carbon additive of Embodiment 2 varies is improved in high- and low-temperature physical properties in proportion to an increase in the content of the low carbon additive.

Figure 1:
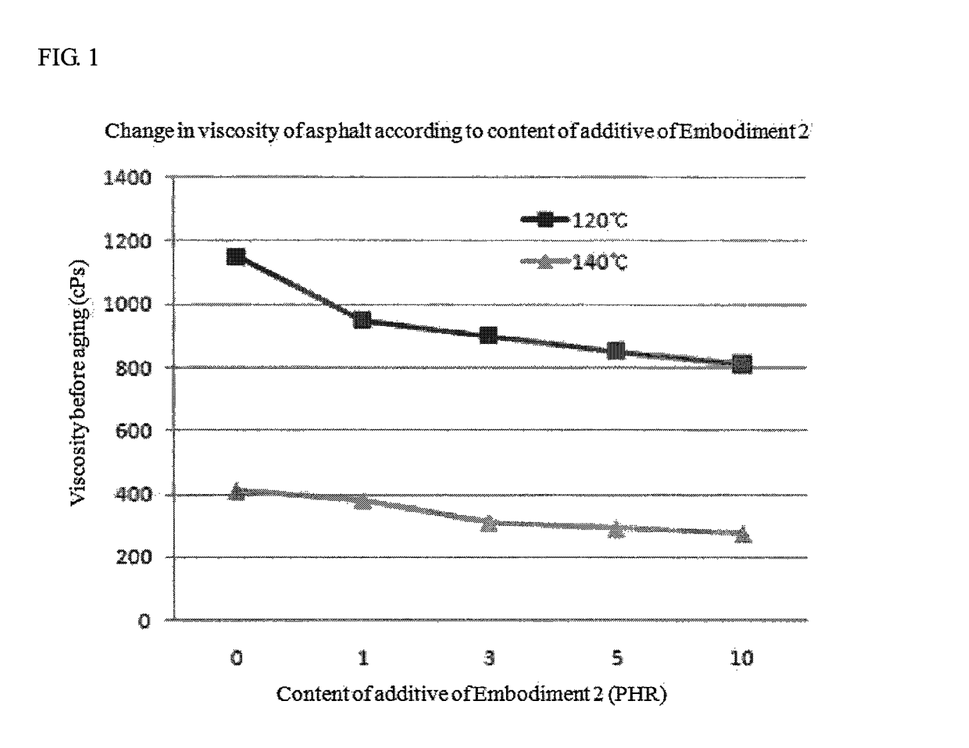
FIG. 1 is a graph showing a change in viscosity depending on a content of the additive in Table 4

FIG. 1 is a graph showing a change in viscosity depending on a content of the additive in Table 4. It can be found that due to this reduction of the viscosity, an effect of the WMA that enables production and spreading of ascon at a lower temperature than a typical HMA is produced.

Figure 2:
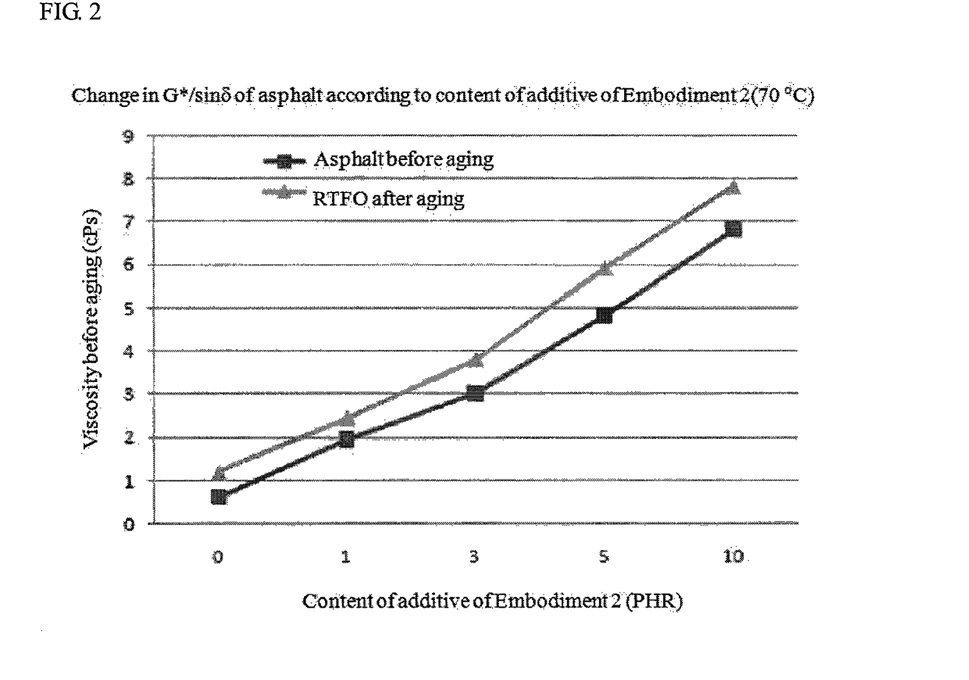
FIG. 2 is a graph showing a change in G*/sin δ according to a content of the additive.

FIG. 2 is a graph showing a change in G*/sin δ according to a content of the additive. This graph is data showing that the change of G*/sin δ abruptly occurs according to the content of the additive, and an asphalt modifying effect is positively produced.

Figure 3:
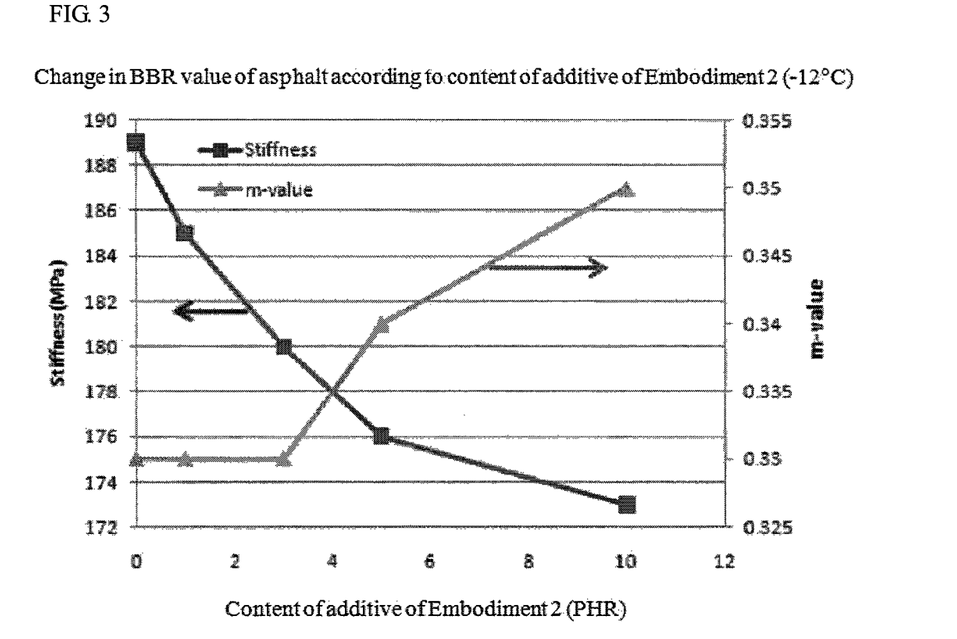
FIG. 3 is test data using a bending beam rheometer (BBR) capable of checking crack resistance of an asphalt binder after aging.

FIG. 3 is test data using a bending beam rheometer (BBR) capable of checking crack resistance of an asphalt binder after aging. It is known that, as the stiffness becomes lower, and the m-value becomes higher, this is favorable for the crack resistance of an asphalt binder. It can be seen that, as the content of the additive of Embodiment 2 becomes higher, this shows a behavior favorable for physical properties of the binder. This behavior does not show in the case of materials such as the existing Sasobit, and thus is unique to the material of the present invention.

Thus, it can be seen that the low carbon additives according to embodiments of the present invention serve to reduce the viscosity, enhance the rutting resistance of the WMA, and complement the reduction of the low-temperature physical properties of the WMA, and thus are suitable as the asphalt additive for the WMA.

(5) Performance Evaluation of WMA Mixture 5.3 parts by weight asphalt and 94.7 parts by weight aggregate were prepared. The low carbon additive of Embodiment 2 was added by 3.0 parts by weight with respect to the content of the asphalt. Thereby, a WMA mixture was produced.

The WMA mixture (Embodiment 7) produced at a temperature of 130° C. using a low carbon additive and the HMA mixture (Comparative Example 7) produced at a temperature of 160° C. without using a low carbon additive were compacted, and their performances were compared and evaluated. To evaluate compaction workability in the asphalt pavement field, an air void test was conducted.

TABLE 5

|  | Production temperature (° C.) | Compaction temperature (° C.) | Content of AP (parts by weight) | Low carbon additive (parts by weight AP) | Air void (%) |
| --- | --- | --- | --- | --- | --- |
| Comparative Example 7 | 160 | 150 | 5.3 | 0 | 4.0 |
| Embodiment 7 | 130 | 120 | 5.2 | 3 | 4.1 |

In Embodiment 7 and Comparative Example 7 as shown in Table 5, their specimens had a difference of about 30° C. between production and compaction temperatures, and little difference between air voids. Thus, it could be seen that Embodiment 7 was excellent in the compaction workability in the pavement field.

Next, specimens were made of the WMA mixture, and a tensile strength retained (TSR) test was conducted to review a difference in moisture sensitivity depending on a reduction in temperature in a resilient modulus test. The results are shown in Table 6 below.

TABLE 6

|  | Production temperature (° C.) | Compaction temperature (° C.) | Resilient modulus (20° C., Mpa) | Kinetic stability (times/mm) | TSR (%) |
| --- | --- | --- | --- | --- | --- |
| Comparative Example 7 | 160 | 150 | 1.08 | 500 | 62 |
| Embodiment 7 | 130 | 120 | 3.18 | 2485 | 87 |

As can be seen from Table 6, Embodiment 7 of the present invention shows that the resilient modulus representing the durability at room temperature is increased about three times, that the kinetic stability representing the rutting resistance at high temperature is increased about five times, and that the TSR representing the resistance to freezing-thawing and moisture is increased 1.4 times.

In other words, it can be seen that the WMA mixture according to Embodiment 7 of the present invention is still lower in production and compaction temperatures than the existing asphalt mixture, so that it is possible to reduce energy when the asphalt concrete is produced according to the present invention, and is excellent in rutting resistance and durability properties, so that it is suitable as the low carbon WMA mixture.

As described above, the excellent properties of the low carbon additive according to the present invention and the asphalt and the WMA mixture produced using the same have been described in detail with reference to the embodiments. The foregoing description concerns an exemplary embodiment of the invention, is intended to be illustrative, and should not be construed as limiting the invention. Many alternatives, modifications, and variations within the scope and spirit of the present invention will be apparent to those skilled in the art.

The invention claimed is:

1. A low carbon additive for a warm-mix asphalt mixture, comprising polyethylene wax and vegetable wax,
    wherein the polyethylene wax and the vegetable wax are contained at a weight ratio of 20:1 to 1:2, and
    the vegetable wax is a modified palm wax having a melting point of 90° C. to 110° C., and the modified palm wax is a melt reaction product of a hydrogenating palm oil extracted from a coconut, with sodium hydroxide (NaOH) and stearic acid ($CH_3(CH_2)_{16}COOH$), wherein the palm wax and the sodium hydroxide used for the modified palm wax have a weight ratio of 100:3.5 to 100:4.0, and the palm wax and the stearic acid used for the modified palm wax have a weight ratio of 100:16.0 to 100:27.5.

2. The low carbon additive according to claim 1, wherein the polyethylene wax has a melting point of 95° C. to 125° C., and a melt viscosity of 80 cPs to 400 cPs at 140° C.

3. The low carbon additive according to claim 1, wherein the vegetable wax is obtained by additionally mixing the palm wax, which is produced from the palm oil extracted from the coconut, into the modified palm wax, the palm wax having a melting point of 55° C. to 65° C.

4. The low carbon additive according to claim 1, further comprising oil, wherein the polyethylene wax and the oil have a weight ratio of 20:1 to 2:1.

5. The low carbon additive according to claim 4, wherein the oil has a kinematic viscosity of 20 cSt to 300 cSt at 40° C.

6. Warm-mix asphalt produced by adding a low carbon additive for the warm-mix asphalt to asphalt, wherein:
the asphalt and the low carbon additive are mixed at a weight ratio of 100:0.5 to 100:15;
the low carbon additive contains polyethylene wax and vegetable wax at a weight ratio of 20:1 to 1:2; and
the vegetable wax is modified palm wax having a melting point of 90° C. to 110° C., and the modified palm wax is generated by melt reaction of palm wax, which is produced by hydrogenating palm oil extracted from a coconut, with sodium hydroxide (NaOH) and stearic acid ($CH_3(CH_2)_{16}COOH$), wherein the palm wax and the sodium hydroxide used for the modified palm wax have a weight ratio of 100:3.5 to 100:4.0, and the palm wax and the stearic acid used for the modified palm wax have a weight ratio of 100:16.0 to 100:27.5.

7. The warm-mix asphalt according to claim 6, wherein the polyethylene wax has a melting point of 95° C. to 125° C., and a melt viscosity of 80 cPs to 400 cPs at 140° C.

8. The warm-mix asphalt according to claim 6, wherein the vegetable wax is obtained by additionally mixing the palm wax, which is produced from the palm oil extracted from the coconut, into the modified palm wax, the palm wax having a melting point of 55° C. to 65° C.

9. The warm-mix asphalt according to claim 8, wherein the palm wax additionally mixed into the modified palm wax and the polyethylene wax have a weight ratio of 50:1 to 1:1.

10. The warm-mix asphalt according to claim 6, further comprising oil, wherein the polyethylene wax and the oil have a weight ratio of 20:1 to 2:1.

11. The warm-mix asphalt according to claim 10, wherein the oil has a kinematic viscosity of 20 cSt to 300 cSt at 40° C.

12. A method of producing a warm-mix asphalt mixture using warm-mix asphalt by mixture of asphalt, aggregate, and a low carbon additive for the warm-mix asphalt mixture, the method comprising:
charging the asphalt, aggregate, and low carbon additive into an asphalt mixing plant; and
mixing the asphalt, aggregate, and low carbon additive charged into an asphalt mixing plant at a temperature of 110° C. to 140° C.,
wherein the asphalt and the low carbon additive have a weight ratio of 100:0.5 to 100:15,
the low carbon additive contains polyethylene wax and vegetable wax at a weight ratio of 20:1 to 1:2, and
the vegetable wax is modified palm wax having a melting point of 90° C. to 110° C., and the modified palm wax is generated by melt reaction of palm wax, which is produced by hydrogenating palm oil extracted from a coconut, with sodium hydroxide (NaOH) and stearic acid ($CH_3(CH_2)_{16}COOH$), wherein the palm wax and the sodium hydroxide used for the modified palm wax have a weight ratio of 100:3.5 to 100:4.0, and the palm wax and the stearic acid used for the modified palm wax have a weight ratio of 100:16.0 to 100:27.5.

13. A method of producing a warm-mix asphalt mixture using warm-mix asphalt by mixture of asphalt, aggregate, and a low carbon additive for the warm-mix asphalt mixture, the method comprising:
melt-mixing the asphalt and the low carbon additive at a weight ratio of 100:0.5 to 100:15 to prepare a melt mixture; and
charging the melt mixture and the aggregate into an asphalt mixing plant, and mixing them at a temperature of 110° C. to 140° C.,
wherein the low carbon additive contains polyethylene wax and vegetable wax at a weight ratio of 20:1 to 1:2, and
the vegetable wax is modified palm wax having a melting point of 90° C. to 110° C., and the modified palm wax is generated by melt reaction of palm wax, which is produced by hydrogenating palm oil extracted from a coconut, with sodium hydroxide (NaOH) and stearic acid ($CH_3(CH_2)_{16}COOH$), wherein the palm wax and the sodium hydroxide used for the modified palm wax have a weight ratio of 100:3.5 to 100:4.0, and the palm wax and the stearic acid used for the modified palm wax have a weight ratio of 100:16.0 to 100:27.5.

14. The method according to claim 12, wherein the asphalt and the aggregate are mixed to have 3.5 to 8.0 parts by weight and 92.0 to 96.5 parts by weight, respectively.

15. The method according to claim 12, wherein the vegetable wax is obtained by additionally mixing the palm wax, which is produced from the palm oil extracted from the coconut, into the modified palm wax, the palm wax having a melting point of 55° C. to 65° C.

16. The method according the claim 13, the asphalt and the aggregate are mixed to have 3.5 to 8.0 parts by weight and 92.0 to 96.5 parts by weight, respectively.

17. The method according to claim 13, wherein the vegetable wax is obtained by additionally mixing the palm wax, which is produced from the palm oil extracted from the coconut, into the modified palm wax, the palm wax having a melting point of 55° C. to 65° C.

\* \* \* \* \*